(12) United States Patent
Merkle et al.

(10) Patent No.: US 10,878,503 B2
(45) Date of Patent: Dec. 29, 2020

(54) SYSTEM AND METHOD OF DETERMINING PORTFOLIO COMPLEXITY

(71) Applicant: Ameriprise Financial, Inc., Minneapolis, MN (US)

(72) Inventors: Kurt J. Merkle, Blaine, MN (US); Justin E. Bell, Coon Rapids, MN (US); Matthew Huss, Edina, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 796 days.

(21) Appl. No.: 14/453,726

(22) Filed: Aug. 7, 2014

(65) Prior Publication Data

US 2016/0042458 A1 Feb. 11, 2016

(51) Int. Cl.
*G06Q 40/06* (2012.01)

(52) U.S. Cl.
CPC .................. *G06Q 40/06* (2013.01)

(58) Field of Classification Search
CPC ........ G06Q 40/06; G06Q 40/04; G06Q 40/10; G06Q 40/00
See application file for complete search history.

(56) References Cited

U.S. PATENT DOCUMENTS

| | | | |
|---|---|---|---|
| 6,970,803 B1 * | 11/2005 | Aerdts | G06Q 10/10 702/179 |
| 7,110,971 B2 | 9/2006 | Wallman | |
| 7,177,774 B1 * | 2/2007 | Brown | G06Q 10/06 702/81 |
| 7,533,049 B2 | 5/2009 | Sato | |
| 8,156,028 B2 * | 4/2012 | Bishop | G06Q 40/00 705/35 |
| 8,595,118 B2 | 11/2013 | McGarel et al. | |
| 2002/0133447 A1 | 9/2002 | Mastman | |
| 2002/0147672 A1 | 10/2002 | Gaini | |
| 2002/0174047 A1 * | 11/2002 | Fernholz | G06Q 10/04 705/36 R |
| 2004/0158406 A1 * | 8/2004 | Harrison | E21B 49/00 702/13 |

(Continued)

FOREIGN PATENT DOCUMENTS

| | | | |
|---|---|---|---|
| WO | 2004029767 A2 | 4/2004 | |
| WO | WO 2010/124332 | * 11/2010 | ............. G06Q 40/00 |
| WO | WO-2010124332 A1 | * 11/2010 | ............. G06Q 40/06 |

OTHER PUBLICATIONS

Koh et al.,: A Risk and Complexity Rating Framework for Investment Products, May 2014, Singapore Management University, Singapore, pp. 1-30.*

Phillips, Isobel: How to Figure Out the Weighted-Average Contribution, Mar. 30, 2014, Demand Media, Web Archives, pp. 1-5.*

(Continued)

*Primary Examiner* — Bijendra K Shrestha (57) ABSTRACT

A method includes determining a plurality of complexity scores. Each of the plurality of complexity scores corresponds to a particular underlying component of a plurality of underlying components of a portfolio. The complexity score of the particular underlying component is based on a complexity rating of the particular underlying component and a contribution level of the particular underlying component to the portfolio. The method also includes determining a complexity score of the portfolio based on the plurality of complexity scores of the plurality of underlying components.

18 Claims, 8 Drawing Sheets

(56) References Cited

U.S. PATENT DOCUMENTS

| | | | |
|---|---|---|---|
| 2006/0270927 A1* | 11/2006 | Viswanathan | G06F 19/3481 600/407 |
| 2007/0206939 A1* | 9/2007 | Ito | G03B 13/34 396/123 |
| 2009/0106308 A1* | 4/2009 | Killian | G06F 16/289 |
| 2010/0318409 A1* | 12/2010 | Mayer | G06Q 10/067 705/325 |
| 2011/0145154 A1* | 6/2011 | Rivers | G06Q 10/06 705/301 |
| 2012/0010925 A1* | 1/2012 | Mitra | G06Q 10/063 705/7.38 |
| 2012/0254053 A1* | 10/2012 | Joa | G06F 16/215 705/319 |
| 2014/0278349 A1* | 9/2014 | Grieves | G06F 17/2735 704/8 |
| 2014/0279679 A1* | 9/2014 | Marshall | G06Q 40/06 705/36 R |
| 2014/0289096 A1* | 9/2014 | Montgomery | G06Q 40/04 705/37 |
| 2015/0134568 A1* | 5/2015 | Riggs | G06F 16/21 705/36 R |
| 2015/0278336 A1* | 10/2015 | Wadhwani | G06F 16/284 707/748 |
| 2016/0125599 A1* | 5/2016 | Stampanoni | A61B 6/483 382/131 |

OTHER PUBLICATIONS

Phillips, Isobel: How to figure out the weighted-average contribution, Mar. 30, 2014, Demand Media, Web Archives, pp. 1-5. (Year: 2014) (Year: 2014).*

Phillips, Isobel: How to Figure Out the Weighted-Average Contribution, Mar. 30, 2014, Demand Media, Web Archives, pp. 1-5 (Year: 2014).*

Koh et alA Risk and Complexity Rating Framework for Investment Products, May 2014, Singapore Management University, Singapore, pp. 1-30 (Year: 2014).*

FINRA: Complex Products Require Heighted Supervision—Focus on Structured Notes, Inverse/Leverage ETFs, Hedge Funds, Securitized Products, and Similar Products, Client Alert, pp. 1-4. (Year: 2012).*

Jacobs, Mark A.: Product Complexity: A Definition and Impacts on Operations, Oct. 2007, University of Dayton, pp. 1-6 (Year: 2000).*

FINRA, Regulatory Notice 12-03, "Heightened Supervision of Complex Products", Jan. 2012, 11 pages.

* cited by examiner

FIG. 1

| Underlying Component | Contribution |
|---|---|
| U.S. Equity Securities | 92.70% |
| S&P Futures | 2.10% |
| Total Return Swaps | 3.50% |
| Cash | 1.70% |
| Total | 100.00% |

*FIG. 2*

| Level of Exposure | Exposure Key | % Contribution | Weighting Factor |
|---|---|---|---|
| Significant Exposure | ● | > 15% | 4 |
| Substantial Exposure | ◕ | 10-15% | 3 |
| Some Exposure | ◑ | 5-10% | 2 |
| Small Exposure | ◔ | 0-5% | 1 |
| Unlikely/No Exposure | ○ | 0% | 0 |

*FIG. 3*

| | Forwards/Futures (Rating=1) | | | | Options Rating=2 | | Swaps Rating=2 | |
|---|---|---|---|---|---|---|---|---|
| Equity | Non-US Treasury Bond Future | US Treasury Bond Future | Commodity | Currency | Interest Rate | Call | Put | Credit Default | Total Return |
| Contrib. ◐ | ○ | ○ | ○ | ○ | ○ | ○ | ○ | ○ | ◐ |
| Score 1*1=1 | | | | | | | | | 1*2=2 |

Overall Portfolio Complexity Score = 1 + 2 = 3

Overall Portfolio Complexity Grade = B

*FIG. 4*

| Complexity "Raw" Score | Complexity Scaled Grade |
|---|---|
| Less than 3 | A |
| 3-5 | B |
| 5-10 | C |
| 10-15 | D |
| More than 15 | E |

SYSTEM AND METHOD OF DETERMINING PORTFOLIO COMPLEXITY

FIELD OF DISCLOSURE

The present application is related to determining a complexity of a portfolio.

BACKGROUND

Making informed investment decisions regarding financial instruments, such as stocks, bonds, portfolios, futures, options, swaps, etc. can be difficult. The average investor has a large variety of investment vehicles to choose from. However, some investment vehicles may be so complex that an investor may have difficulty understanding how such investment vehicles function. For example, an investor may have trouble understanding how mortgage-backed securities, asset-backed securities, collateralized mortgage obligations, and collateralized debt obligations function in different situations. When multiple complex components are combined into a portfolio, it may be difficult to understand and analyze performance of the portfolio.

Many portfolios include underlying financial components of varying types having varying risks and varying exposure to capital and bond markets. A portfolio with multiple underlying components may provide a return on investment, but the returns may not be stable and may be volatile. Thus, an investor may run the risk of incurring a loss, including a loss on an invested principal amount. The performance of a portfolio may depend on the underlying components. Further, because different types of components may be included in a portfolio, it may be difficult to predict expected returns of the portfolio. For example, when an investor buys a bond, the investor can anticipate expected cash flow with relatively high accuracy. However, in the case of a hedge portfolio that has multiple underlying components that are complex and volatile, it may be difficult to accurately predict cash flow. In some cases, even an experienced investor or a financial advisor or broker selling the complex portfolio may not be fully aware of the complexities that govern the volatility and returns of the underlying components of the portfolio.

SUMMARY

The present application describes a system and method to determine a complexity of a portfolio. For example, the complexity of the portfolio may be determined based on a complexity of underlying components of the portfolio, including but not limited to stocks, bonds, portfolios, futures, swaps, etc.

The Financial Industry Regulatory Authority (FINRA) has issued regulatory notice 12-03, entitled "Heightened Supervision of Complex Products." However, notice 12-03 does not define the term "complex" or provide an exhaustive list of features that may render a product "complex."

As used herein, the "complexity" of a component (e.g., security) or portfolio (e.g., investment portfolio) is different from, and independent of, a risk or a volatility of the component or portfolio. Further, complexity may not necessarily be proportional to or correlated with risk or volatility. As an example, in some investment portfolios, overlaying additional complexity may reduce volatility/risk of the portfolio. To illustrate, to decrease risk/volatility of a portfolio of equities, an index put option may be added as an overlay to the portfolio of equities. The index put option increases the overall complexity of the portfolio but decreases downside exposure of the portfolio via hedging (e.g., if the equity portion of the portfolio loses value, the put value increases so that a total return of the portfolio is less volatile).

In one example, to determine a complexity of a portfolio, a complexity score (or rating) is determined for each of the underlying components in the portfolio. The complexity score of a component may be based on a complexity rating of the component and a contribution level (e.g., percentage) of the component to the portfolio. To illustrate, because futures may be less complex than options or swaps, futures may have a complexity rating of one (1) and options and swaps may have a complexity rating of two (2). Other types of components may have other complexity ratings. For example, non-security elements may have a complexity rating of 0.25 and an exposure of 100% or 0%. Thus, a complexity rating may indicate a relative complexity level of a particular type of component. Components that are determined to be non-complex, such as stocks and bonds, may have a complexity rating of zero. The complexity ratings may be based on certain parameters associated with the components, including but not limited to qualification as a pooled asset backed security, prepayment risk, counter party risk, dependency of repayment of principal, etc.

Once the complexity rating of an underlying component is determined, the complexity score for the component may be determined by weighting the complexity rating by the percentage contribution of the component to the portfolio. For example, the complexity rating of a component that is less than 10% of a portfolio may be weighted lower than the complexity rating of a component that is more than 10% of the portfolio. The overall complexity score of the portfolio may be determined by adding the complexity scores of the underlying components of the portfolio. In selected implementations, the complexity score of a portfolio can be further converted into a scaled score (e.g., a letter grade). The complexity scores or grades of portfolios may be used to trigger various operations. For example, when the complexity of a particular portfolio exceeds a threshold, one or more actions may be automatically initiated. Examples of such actions include, but are not limited to, providing training materials to financial advisors, performing diligence tasks regarding a portfolio provider and/or portfolio manager, alerting an individual regarding changes in portfolio complexity, etc.

BRIEF DESCRIPTION OF DRAWINGS

The detailed description is described with reference to the accompanying figures. In the figures, the left-most digit(s) of a reference numeral identifies the figure in which the reference numeral first appears. The same numbers are used throughout the drawings to reference like features and components.

DETAILED DESCRIPTION

Systems and methods of determining portfolio complexity are disclosed. A "complex" portfolio or component may be one whose functioning, risks, return, exposure to primary and secondary markets, and/or terms & conditions are not ordinarily understood by an average investor. Thus, the complexity of a portfolio or component may be independent of metrics such as risk and volatility. The described techniques enable determining and comparing complexities of portfolios based on complexities of the underlying components of the portfolios. As used herein, a "portfolio" is a collection of "components." A "component" may be an item that can be bought/added and sold/removed from a portfolio. A "component" may also be a characteristic, add-on, parameter, etc. of a portfolio, as further described herein.

In a particular embodiment, complexity ratings may be determined and stored for different component types, such as futures, swaps, options, bonds, commercial real estate, commodity linked notes, credit linked notes, retail structured products, participatory notes, Cayman subsidiaries, short positions or accounting leverage, etc. To determine a complexity of a portfolio, a complexity score of each underlying component in the portfolio may be summed. The complexity score for a particular underlying component may be a product of the complexity rating of the underlying component and a weighting factor that depends on a contribution (e.g., percentage) of the underlying component to the portfolio as a whole. In alternate embodiments, different mathematical functions may be used to determine component complexity and/or portfolio complexity. In some embodiments, a portfolio's complexity score (or a scaled version thereof) may be used to automatically initiate one or more actions, such as providing training materials to financial advisors, performing diligence tasks regarding a portfolio provider and/or portfolio manager, alerting an individual regarding sudden changes in portfolio complexity, etc.

Figure 1:
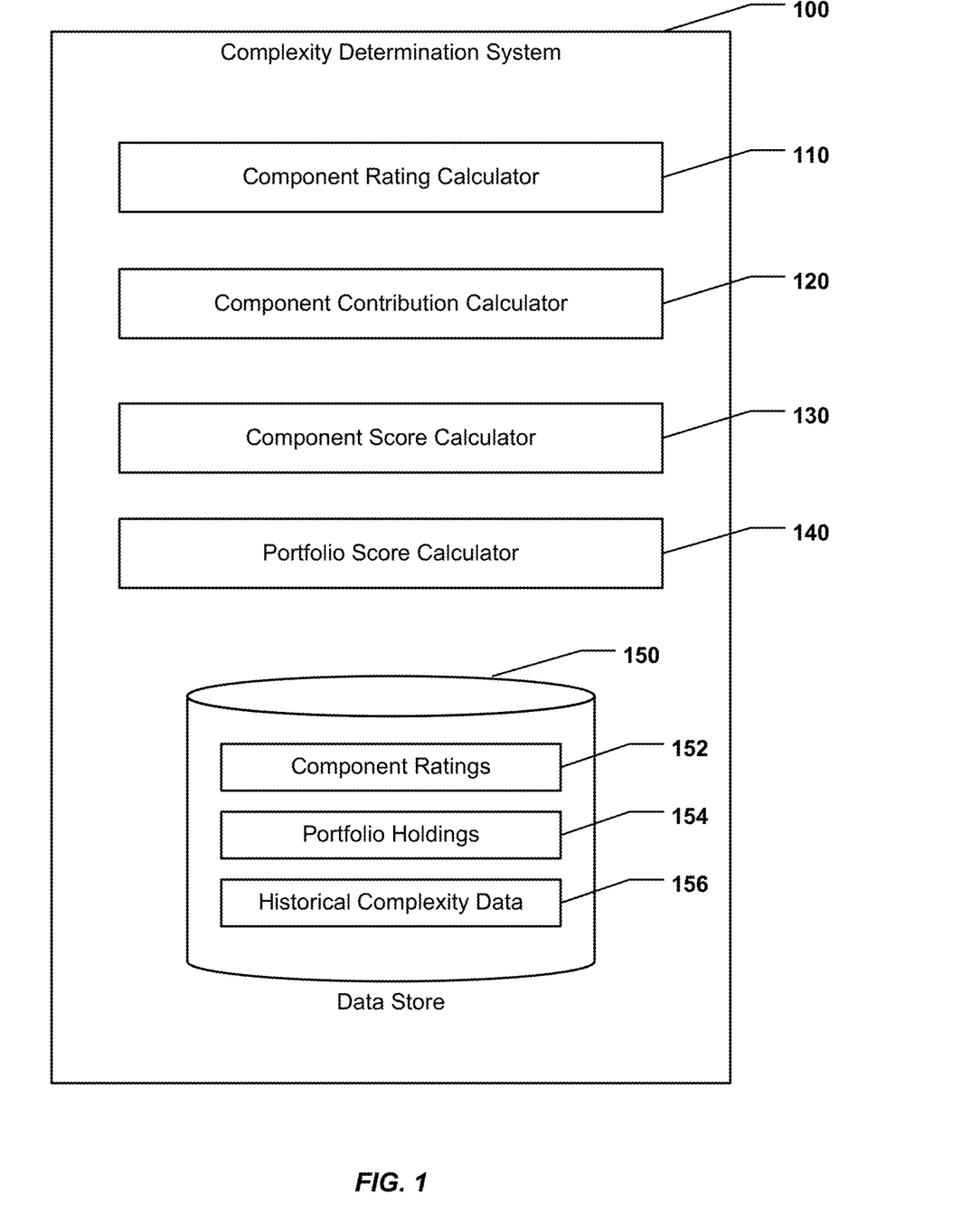
FIG. 1 illustrates a diagram of a particular embodiment of a complexity calculation system.

FIG. 1 illustrates a diagram of a particular embodiment of a complexity determination system 100. In the illustrated embodiment, the system 100 includes a component rating calculator 110, a component contribution calculator 120, a component score calculator 130, and a portfolio score calculator 140. Each of the calculators 110-140 may correspond to hardware device(s) at the system 100 (e.g., one or more processors), software at the system 100 (e.g., instructions executable by one or more processors), or a combination thereof. The system 100 also includes or has access to a data store 150, such as a database or other data storage.

The component rating calculator 110 may compute ratings for at least one component that forms part of a portfolio. In one embodiment, the rating of the component may be based on a component type of the component. For example, computed component ratings may be stored in the data store 150 as component ratings 152. The component ratings 152 may be dynamically determined or predefined. Examples of component types include, but are not limited to, futures, swaps, options, bonds, commercial real estate, commodity linked notes, credit linked notes, retail structured products, participatory notes, Cayman subsidiaries, short positions or accounting leverage, etc.

In a particular embodiment, the component ratings 152 may be numerical. For example, a first group of component types may have a first numerical rating, a second group of component types may have a second numerical rating, etc., where a higher complexity rating indicates higher complexity. In an illustrative example, futures may have a rating of one (1), options and swaps may have a rating of two (2), and short positions may have a rating of 0.25 and an exposure of 100% or 0%. Non-complex components, such as stocks, bonds, and cash, may have a rating of 0. The component rating calculator 110 may compute the component rating 152 for a particular type of component based on whether or not the component exhibits certain parameters. For example, parameters that determine whether and how complex a component is may include, but are not limited to, qualification as a pooled asset backed security, contribution of risks (e.g., prepayment risks and counter party risks), dependency of repayment of principal, yield with respect to reference assets, etc. Thus, in response to automatic or user input driven selection of a particular portfolio, the component rating calculator 110 may calculate the complexity ratings of each underlying component of the portfolio.

In a particular embodiment, to determine which component types are complex and which component types are not complex, component types may be classified into categories. For example, the categories may include equity, fixed income, and other. Equity components may include listed common stock, private equity, retail structured products (e.g., products that are based on market indexes, such as exchange traded products, products that are based on commodity-based indexes, or products that are based on a combination of multiple indexes), etc.

Fixed income components may include various subcategories, such as treasuries, agency, foreign fixed income, brokered certificates of deposit (CDs), corporates, municipals, mortgage backed securities (MBS), asset backed securities (ABS), preferred, and bank loans. Treasury components may include bills, notes, bonds, treasury inflation-protected securities (TIPS), separate trading of registered interest and principal securities (STRIPS) principal, and STRIPS coupon. Agency components may include on/off the run components and floating components, and foreign fixed income components may include sovereign/supranationals U.S. Dollar currency, sovereign/supranationals foreign currency, and Yankee bond. Corporate components may include straight, convertible, equipment trust certificates/enhanced equipment trust certificates, constant maturity spread (swap rate, treasury rate, and London interbank offered rate (LIBOR)), inverse floater notes, step up coupon notes, step down coupon notes, stepped cap/floor floater notes, fixed to floating rate notes, flip-flips (switch coupon bonds), capital contingent notes, ratchet floaters, floater notes, leveraged floater notes, dual-index notes (steepeners/flatteners), floaters with curve cap, range accrual notes, inflation linked notes, zero coupon accreting as a structured coupon, target redemption notes (TARNs), credit linked notes and commodity linked notes. Municipal components (e.g., bonds) may include unlimited tax or limited tax general obligation (GO), revenue, special assessment, tax allocation, auction rate, variable rate demand obligation (VRDO), special tax, certificate of participation, and floating. Mortgage backed securities (MBS) may include agency pass through, agency collateralized mortgage obligations (CMO), agency interest only (IO), agency principal only (PO), agency floater, agency inverse floater, private label, and commercial MBS (CMBS). Asset backed securities (ABS) may include credit card receivables, auto loan receivables, home equity line of credit (HELOC), student loans, collateralized debt obligations (CDO), and collateralized loan obligations (CLO). Preferred components may include straight, convertible, and mandatory convertible.

Additional types of components may include cash, forward contracts, future contracts, options, swaps, collectibles, real estate, and physical commodities. Cash may include domestic and foreign currency. Forward contracts may include equity, non-US Treasury bond, US Treasury bond, commodity, currency, and interest rate. Future contracts may also include equity, non-US Treasury bond, US Treasury bond, commodity, currency, and interest rate. Options may include call options and put options. Swaps may include credit default, commodity, equity, currency, interest rate, swaptions, total return, and participatory notes. Collectibles may include art, coins, horses, stamps, and wine. Real estate may include raw land, commercial real estate, other real estate, exchange traded real estate investment trusts (REITs), and non-traded REITs. It should be noted that the above list of items that may be a component of a portfolio is intended to be illustrative, and is not limiting. A portfolio may include stocks, bonds, cash, and various types of "alternative investments," each of which may contribute a different amount of complexity to the portfolio.

In a particular embodiment, each of the different component types described above may be examined in light of one or more parameters that, if exhibited by the component type, may render the component type complex. For example, parameters associated with complexity may include, but are not limited to:

1. Whether a component is a pooled asset backed security
2. Whether a component has prepayment risk (which is not to be confused with call risk)
3. Whether a component involves credit worthiness of underlying borrower(s) that is not readily apparent
4. Whether a component has embedded derivative options that may be difficult to understand, such as:
    a. Repayment of principal or yield depends on a reference asset when information about performance of the reference asset is not readily available
    b. Provides for different stated returns throughout the life of the component contingent upon whether a reference asset performs in a range
    c. Investors may incur a capital loss without being able to participate in an increase in value
    d. Performance of the reference asset may have a disproportionate impact on prepayment of capital or on the payment of return
5. Whether a component has contingencies in gains and losses, particularly those that depend on multiple mechanisms across asset classes
6. Whether a component is a structured note with "worst of" features
7. Whether a component is an investment tied to performance of market(s) that may not be well understood by investors
8. Whether a component has principal protection that is conditional, partial, or that can be withdrawn
9. Whether a component has leveraged returns that can be reset periodically
10. Whether a component has complicated limits or formulas for the calculation of investor gains (e.g., 4× upside)
11. Whether a component involves counterparty risk Most of the aforementioned components may exhibit zero or only one of the listed complexity parameters, and may therefore be deemed as non-complex and have a complexity rating of zero. Component types that exhibit exactly two of the listed complexity parameters may be assigned a complexity rating having a first value (e.g., one (1)). For example, the following component types may have a complexity rating of 1, where the numbers in the parentheses identify the associated complexity parameters: leveraged floater note (7, 10), dual-index note (4b, 7), floater with a curve cap (4b, 7), range accrual note (4b, 7), TARN (4b, 10), agency pass through MBS (1, 2), agency CMO MBS (1, 2), agency IO MBS (1, 2), agency PO MBS (1, 2), agency floater MBS (1, 2), agency inverse floater MBS (1, 2), bank loans (2, 3), all future contracts (7, 10), and commercial real estate (2, 3).

Component types that exhibit more than two of the listed complexity parameters may be assigned a complexity rating having a second value (e.g., two (2)). For example, the following component types may have a complexity rating of 2, where the numbers in the parentheses identify the associated complexity parameters: retail structured products (3, 5, 6, 7), constant maturity spread—swap rate (4a, 7, 11), credit linked note (3, 4a, 7, 10), commodity linked note (4a, 7, 10), private label MBS (1, 2, 3), CMBS (1, 2, 3), all ABS (1, 2, 3 (except for HELOC), 11), all forward contracts (3, 7, 10), call and put options (4c, 7, 10), and all swaps (7, 10, 11).

In a particular embodiment, additional types of components or characteristics may also be assigned a complexity rating. For example, non-daily liquidity, portfolio of portfolios, Cayman subsidiary, short positions, and accounting leverage (borrowing portfolios from a third party) may be assigned a complexity rating having a third value (e.g., 0.25) and an exposure of 100% or 0%. In an alternative embodiment, complexity ratings may be alphabetical or alphanumeric.

In an illustrative embodiment, the component rating calculator 110 identifies the underlying components of a portfolio based on data regarding portfolio holdings 154 stored in the data store 150. In one example, the portfolio holdings 154 are dynamically determined based on information retrieved from an external data source via a network. For example, information regarding portfolio holdings at a particular point in time (e.g., close of trading on a particular day) may be retrieved from an external server or website that maintains updated trading data and portfolio holdings information. The component rating calculator 110 may also retrieve and parse non-dynamic investment information, such as prospectus information, to determine the portfolio holdings 154 or characteristics (e.g., whether the portfolio prospectus indicates that the portfolio owns a subsidiary in the Cayman Islands).

Figure 2:
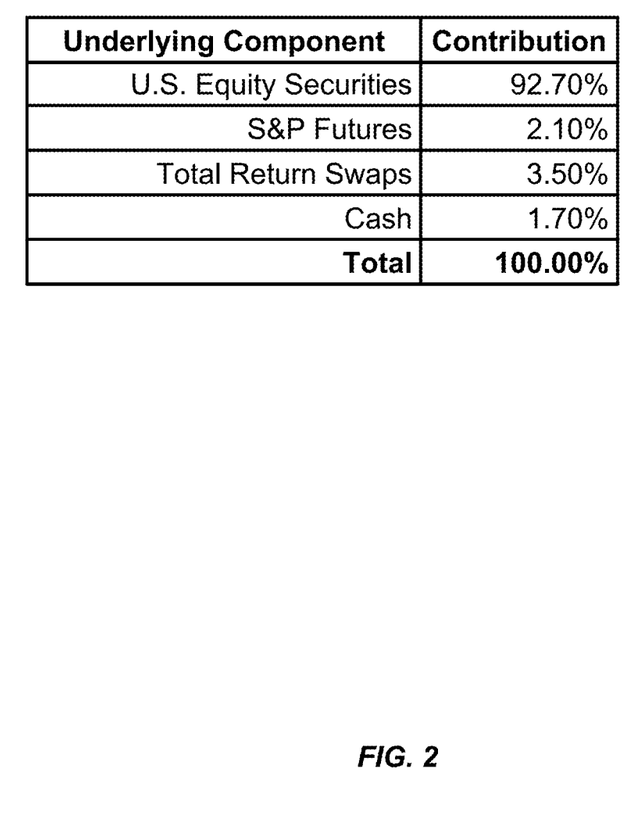
FIG. 2 illustrates a particular example of a portfolio.

The component contribution calculator 120 may determine a contribution of each underlying component in a portfolio to the portfolio as a whole. For example, the component contribution calculator 120 may determine that a particular underlying component makes up a particular percentage of the portfolio, in terms or notional value, number of shares, etc. For example, FIG. 2 depicts a table showing underlying components of an illustrative portfolio. As shown in FIG. 2, the portfolio includes 92.70% U.S. equity securities, 2.10% Standard & Poor's (S&P) futures, 3.50% total return swaps, and 1.70% cash. In a particular embodiment, the component contribution calculator 120 automatically and dynamically determines the percentage level contributions of each of the underlying components based on information stored in the data store 150 and/or information retrieved from an external data source via a network. For example, the component contribution calculator 120 may retrieve information regarding portfolio holdings from an external server or website that maintains updated trading data and portfolio holdings information based on trading performed by a manager of the portfolio. The component contribution calculator 120 may also retrieve and parse other investment information, such as prospectus information, during computation of percentage values. In a particular embodiment, the component rating calculator 110 and/or the component contribution calculator 120 may use a mapping between different naming conventions of different external data sources (e.g., portfolio providers). Because different data sources may use different names for items such as derivatives and notional values, such a mapping may enable the complexity determination system 100 to consolidate data from multiple data sources. In an illustrative embodiment, the mapping may be stored in the data store 150.

Figure 3:
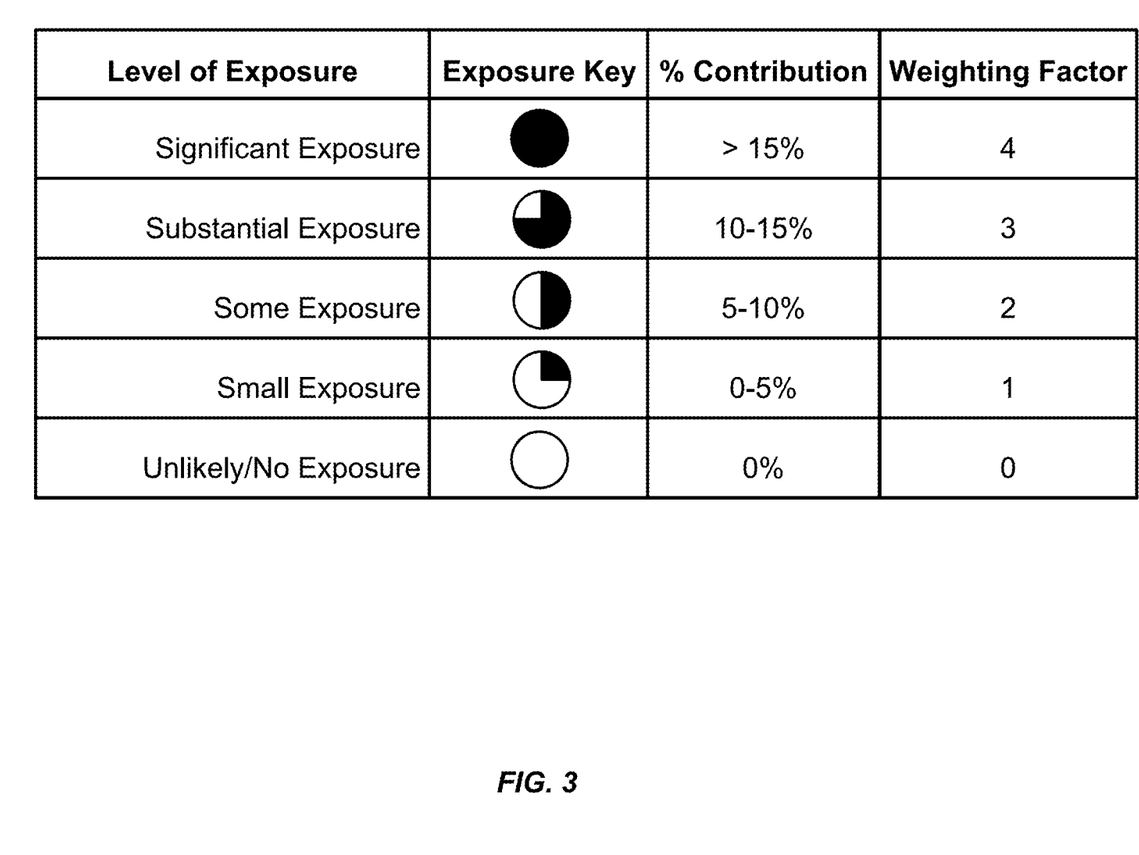
FIG. 3 illustrates a particular embodiment of a weighting scale.

In a particular embodiment, the component contribution calculator 120 may determine a weighting factor based on the percentage contribution values. For example, as shown in FIG. 3, the component contribution calculator 120 may determine that an underlying component that makes up an amount of a portfolio that is in a first range (e.g., 0%) has a first complexity weighting factor (e.g., 0). An underlying component that makes up an amount of a portfolio that is in a second range (e.g., greater than 0% and less than or equal to 5%) may have a second complexity weighting factor (e.g., 1). An underlying component that makes up an amount of a portfolio that is in a third range (e.g., greater than 5% and less than or equal to 10%) may have a third complexity weighting factor (e.g., 2). An underlying component that makes up an amount of a portfolio that is in a fourth range (e.g., greater than 10% and less than or equal to 15%) may have a fourth complexity weighting factor (e.g., 3). An underlying component that makes up an amount of a portfolio that is in a fifth range (e.g., greater than 15%) may have a fifth complexity weighting factor (e.g., 4). Thus, two or more of the ranges may be equal in size. It should be noted that the weighting scheme shown in FIG. 3 is for illustration only, and is not to be considered limiting. In alternate embodiments, a different weighting scheme may be used, and the margins between different weighting factors (e.g., the size of the ranges) may be greater than or less than 5%.

The component score calculator 130 may determine a complexity score for an underlying component of a portfolio based on outputs of the component rating calculator 110 and the component contribution calculator 120. To illustrate, one of the underlying components of the portfolio shown in FIG. 2 is total return swaps, which make up 3.50% of the portfolio. The component rating calculator 110 may determine, based on the component ratings 152, that the total return swaps have a rating of 2. The component contribution calculator 120 may determine, in accordance with the table of FIG. 3, that the total return swaps have a weighting factor of 1, because the total return swaps fall in the 0-5% range in the table of FIG. 3. The component score calculator 130 may determine a complexity score for the total return swaps based on the complexity rating of 2 and the contribution weighting factor of 1. In an illustrative embodiment, the component score calculator 130 may multiple the complexity rating and the weighting factor to determine the complexity score. Thus, the component score calculator 130 may determine that the complexity score of the total returns swaps is 2*1=2.

Figure 4:
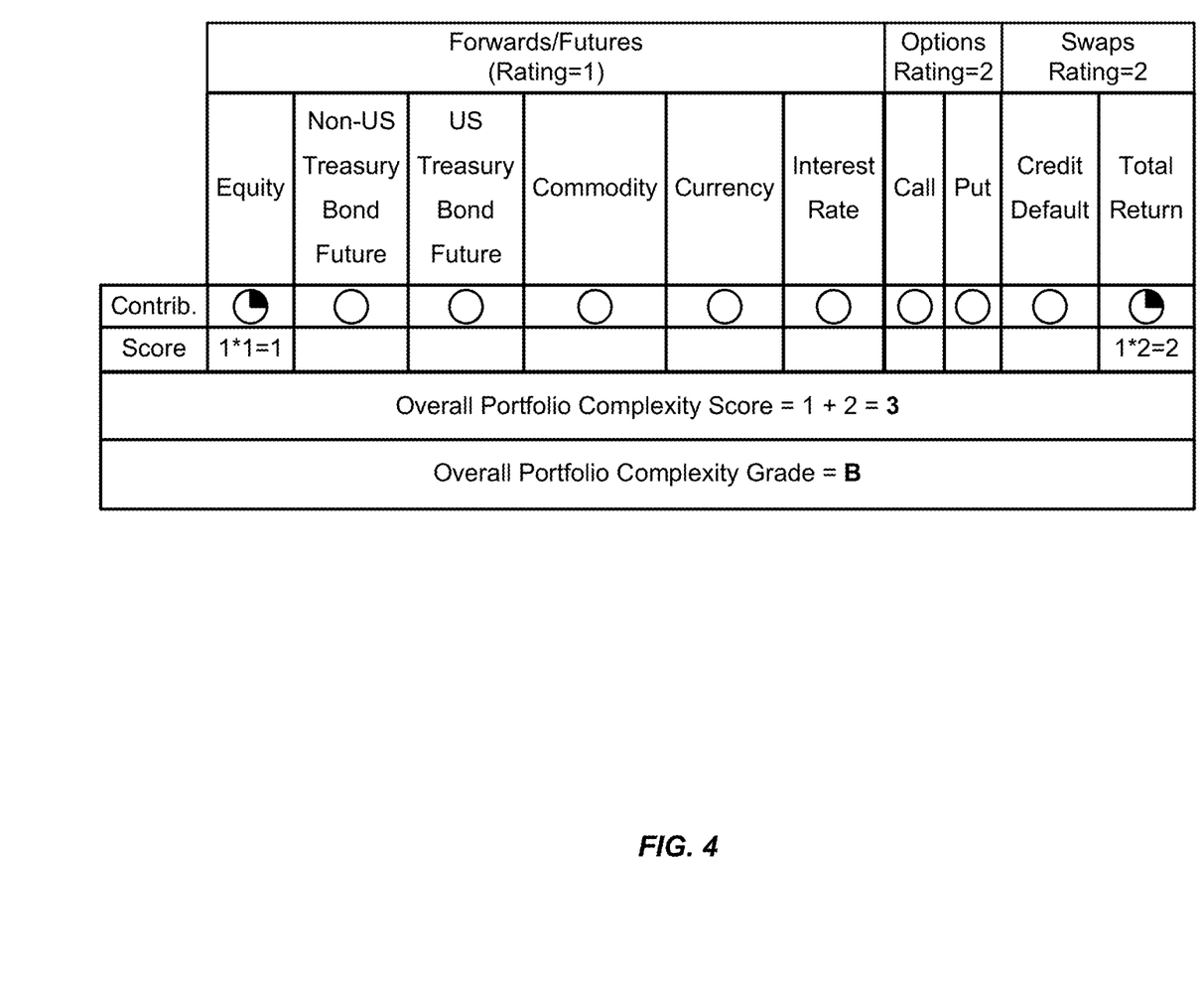
FIG. 4 illustrates a particular embodiment of a method of determining a complexity of a portfolio.

The component score calculator 130 may similarly determine complexity scores for other complex underlying components in the portfolio of FIG. 2. For example, as shown in FIG. 4, the component score calculator 130 may determine that the complexity score for the 2.10% of S&P futures in the portfolio of FIG. 2 is 1*1=1. The component score calculator 130 may not calculate a complexity score (or may calculate a score of zero) for underlying components that are classified as non-complex, such as the 92.70% of U.S. equity securities and the 1.70% of cash in the portfolio of FIG. 2. In an illustrative embodiment, the component ratings 152 identify non-complex components by assigning the non-complex components a rating of zero. It should be noted that the component types shown in FIG. 4 (equity futures, call options, total return swaps, etc.) are not to be considered exhaustive. Various additional types of components, such as those described above, may also be present in a portfolio and considered when determining portfolio complexity.

The portfolio score calculator 140 may determine an overall complexity score for a portfolio based on the complexity scores for individual underlying components output by the component score calculator 130. In a particular embodiment, the complexity score of a portfolio may be determined based on a sum of the complexity scores of the underlying components in the portfolio. For example, as shown in FIG. 4, the overall complexity score for the portfolio of FIG. 2 may be 1+2=3. In alternate embodiments, the complexity of a portfolio may be calculated using different mathematical function(s).

Figure 5:
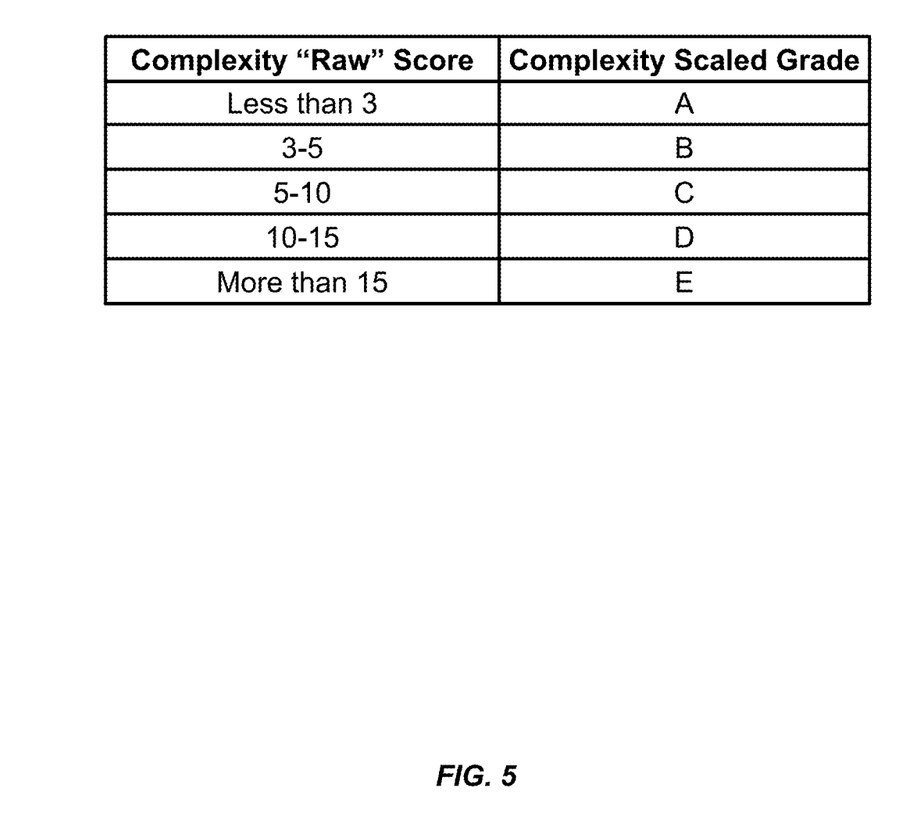
FIG. 5 illustrates a particular embodiment of a complexity grading scale.

In a particular embodiment, the portfolio score calculator 140 determines a scaled alphabetical complexity grade for a portfolio. For example, in an alphabetical complexity scale, A may represent least complex and a highest letter may represent most complex. A particular embodiment of a grading scale is shown in FIG. 5. In FIG. 5, a complexity grade of A corresponds to a complexity score of less than 3, a complexity grade of B corresponds to a complexity score of 3-5, etc. Thus, as shown in FIG. 4, the portfolio of FIG. 2 may have a complexity grade of B. It should be noted that the grading scale shown in FIG. 5 is for illustrative purposes only and is not to be considered limiting. In alternate embodiments, a different scale may be used.

The system 100 of FIG. 1 may thus enable automatic determination of a complexity of a portfolio, including automatic determination of complexity of the underlying components in the portfolio. Further, the system 100 may enable automatic initiation or performance of certain response actions when the complexity of a portfolio is determined or has changed. For example, the system 100 may automatically send an alert (e.g., an e-mail, a text message, etc.) to a particular party based on the determined complexity of a portfolio. As another example, a financial advising firm may provide training materials to financial advisors, so that the financial advisors are well-equipped to explain the reason why a particular portfolio or component is complex to an average investor. The financial advising firm may also initiate due diligence or auditing actions with respect to a particular portfolio, portfolio provider, or portfolio manager.

In a particular embodiment, the complexity of a portfolio may be automatically determined and evaluated periodically, such as twice a year. As the complexity information is determined, the complexity information may be stored in the data store 150 as historical complexity data 156. Thus, the historical complexity data 156 may include time series complexity data that can be used to examine portfolio manager changes, trends over a period of time (e.g., a particular portfolio manager remains devoted to a particular type of component or is starting to incorporate increasingly complex components into the portfolio), etc. Whereas metrics such as Sharpe ratio and standard deviation may be used to determine "style drift" of a portfolio, the historical complexity data 156 may be used to determine "complexity drift" of a portfolio, indicating whether the portfolio (or a component thereof) is accurately tracking a stated benchmark. "Complexity drift" may be used by investors, financial advisors, and/or financial firms in making portfolio selection decisions.

It should be noted that although the above description is related to determining the complexity of portfolios, the present disclosure is not so limited. The described systems and methods may also be used to evaluate the complexity of an investment strategy/category, which may include multiple portfolios. Thus, the complexity of an investment strategy/category may be based on an average or sum of the complexities of the portfolios in the investment strategy/category.

Figure 6:
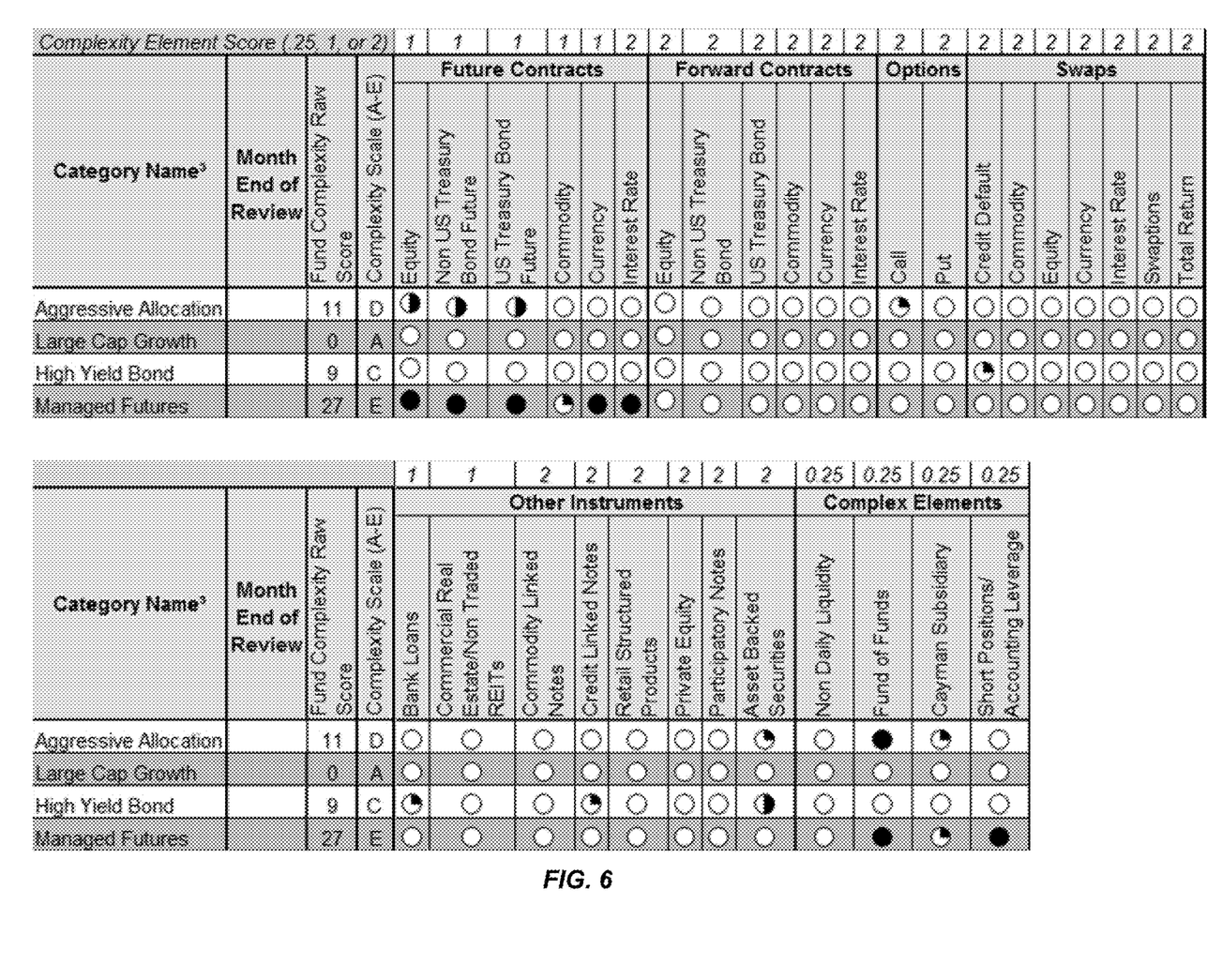
FIG. 6 illustrates a particular embodiment of a method of evaluating complexity of investment strategies/categories.

FIG. 6 illustrates a table representing a particular embodiment of evaluating the complexity of multiple investment strategies/categories. The table of FIG. 6 is divided into two horizontal sections to fit on one sheet. One or more of the strategies/categories may correspond to an actual or hypothetical portfolio of portfolios. For example, a "Large Cap Growth" category may correspond to a group of one or more securities or portfolios offered to investors by a particular broker or investment firm. In the embodiment of FIG. 6, the "Large Cap Growth" category has a complexity grade of A. In the embodiment of FIG. 6, "Asset Backed Securities" may include Mortgage-Backed Securities (MBS), Commercial Mortgage-Backed Securities (CMBS), Collateralized Debt Obligation (CDO), Collateralized Bond Obligation (CBO), Collateralized Loan obligation (CLO), Collateralized Mortgage Obligation (CMO), Equipment Trust Certificates, and Municipal Asset Backed Securities (Tobacco Revenue Bonds). "Short Positions/Accounting Leverage" may refer to accounting leverage that may result from borrowing funds from a third party and/or notional leverage that may result from the use of derivatives. The category names (e.g., "Aggressive Allocation," "Large Cap Growth," "High Yield Bond," and "Managed Futures") may refer to categories established by a third party enterprise, such as Morningstar® (Morningstar is a registered trademark of Morningstar, Inc. of Chicago, Ill.). The exposure for a category may be based on an aggregation of a corresponding group of portfolios (or estimate thereof).

Figure 7:
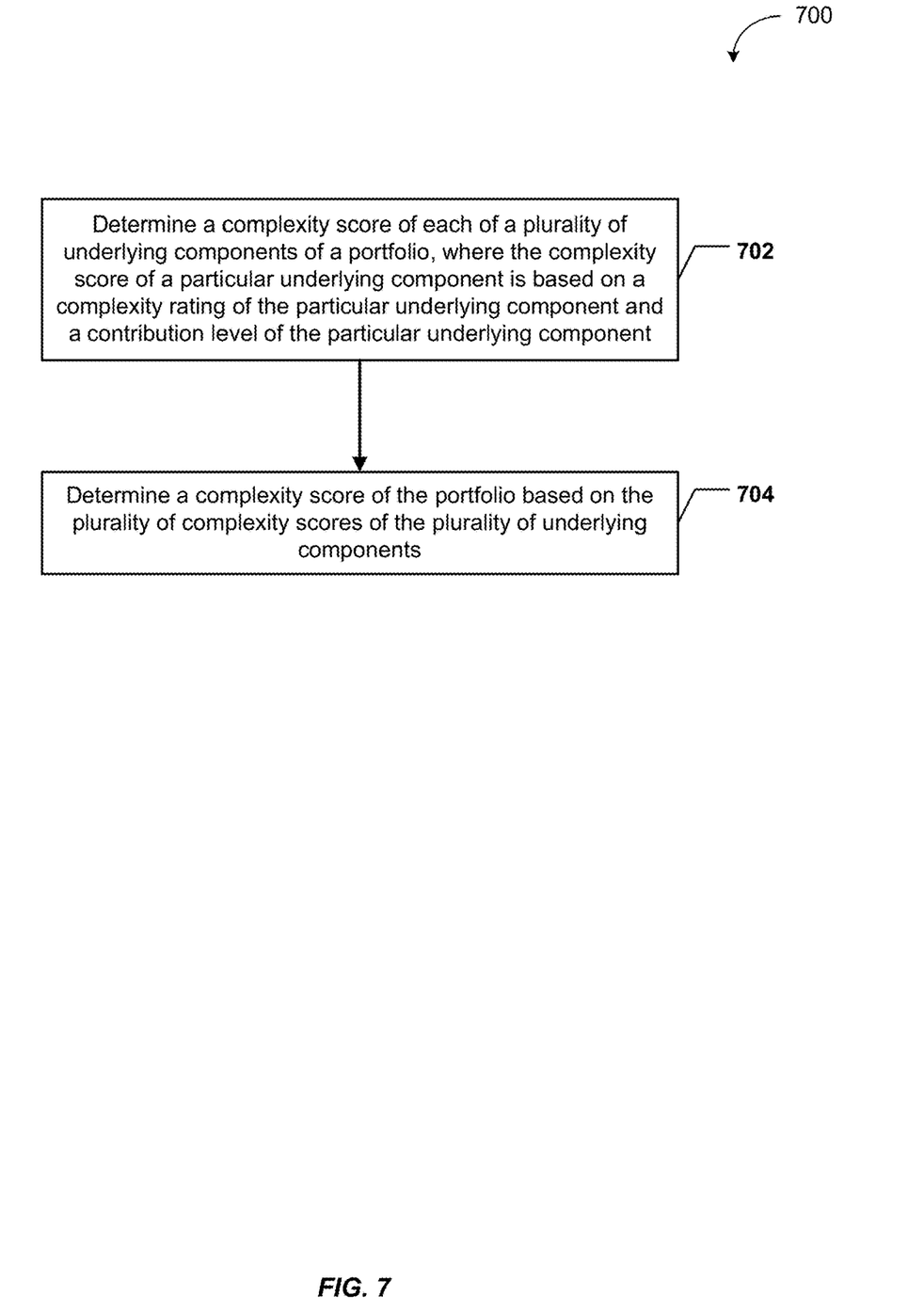
FIG. 7 illustrates a particular embodiment of a method of operation by the system of FIG. 1.

FIG. 7 illustrates a particular embodiment of a method 700 of determining a complexity of a portfolio. In an illustrative embodiment, the method 700 may be performed by the system 100 of FIG. 1.

The method 700 includes determining a complexity score of each of a plurality of underlying components of a portfolio, at 702. The complexity score of a particular underlying component is based on a complexity rating of the particular underlying component and a contribution level of the particular underlying component to the portfolio. For example, referring to FIGS. 1-4, the component score calculator 130 may determine complexity scores for the S&P futures and the total return swaps in the portfolio of FIG. 2.

In an illustrative embodiment, the complexity score for the S&P futures is equal to a product of a complexity rating and a weighting factor. The complexity rating may be 1, because the S&P futures are equity futures, and the weighting factor may be 1, because the S&P futures make up 2.10% of the portfolio. Thus, the complexity score of the S&P futures may be 1*1=1. Similarly, the complexity rating for the total return swaps may be 2 and the weighting factor may be 1, because the total return swaps make up 3.50% of the portfolio. Thus, the complexity score of the total return swaps may be 2*1=2.

The method 700 also includes determining a complexity score of the portfolio based on the plurality of complexity scores of the plurality of underlying components, at 704. For example, referring to FIGS. 1-4, the portfolio score calculator may sum the complexity scores of the S&P futures and the total return swaps to determine a complexity score for the portfolio. Thus, the portfolio may have a complexity score of 1+2=3.

In particular embodiments, the method 700 may include determining a scaled complexity grade for the portfolio based on the complexity score. For example, the scaled complexity grade may be determined based on the grading scale of FIG. 5. In a particular example, the portfolio of FIG. 2 may have a complexity grade of B based on a complexity score of 3.

In particular embodiments, the method 700 may include initiating at least one action based on the complexity score or grade for a portfolio. For example, an action may be automatically initiated when the complexity score or grade for the portfolio exceeds a threshold, such as an absolute threshold or a threshold complexity delta occurring within a particular period of time (e.g., one year). Different thresholds may be established for different portfolios or tax different types of investors (e.g., lower sophistication investors vs. more sophisticated institutional investors, private placement vs. public issue, etc.). The at least one action may include an alerting action (e.g., sending an e-mail or text message to a particular party), a training action (e.g., providing training material to a particular financial advisor or scheduling a training session), a due diligence or auditing action, etc.

Figure 8:
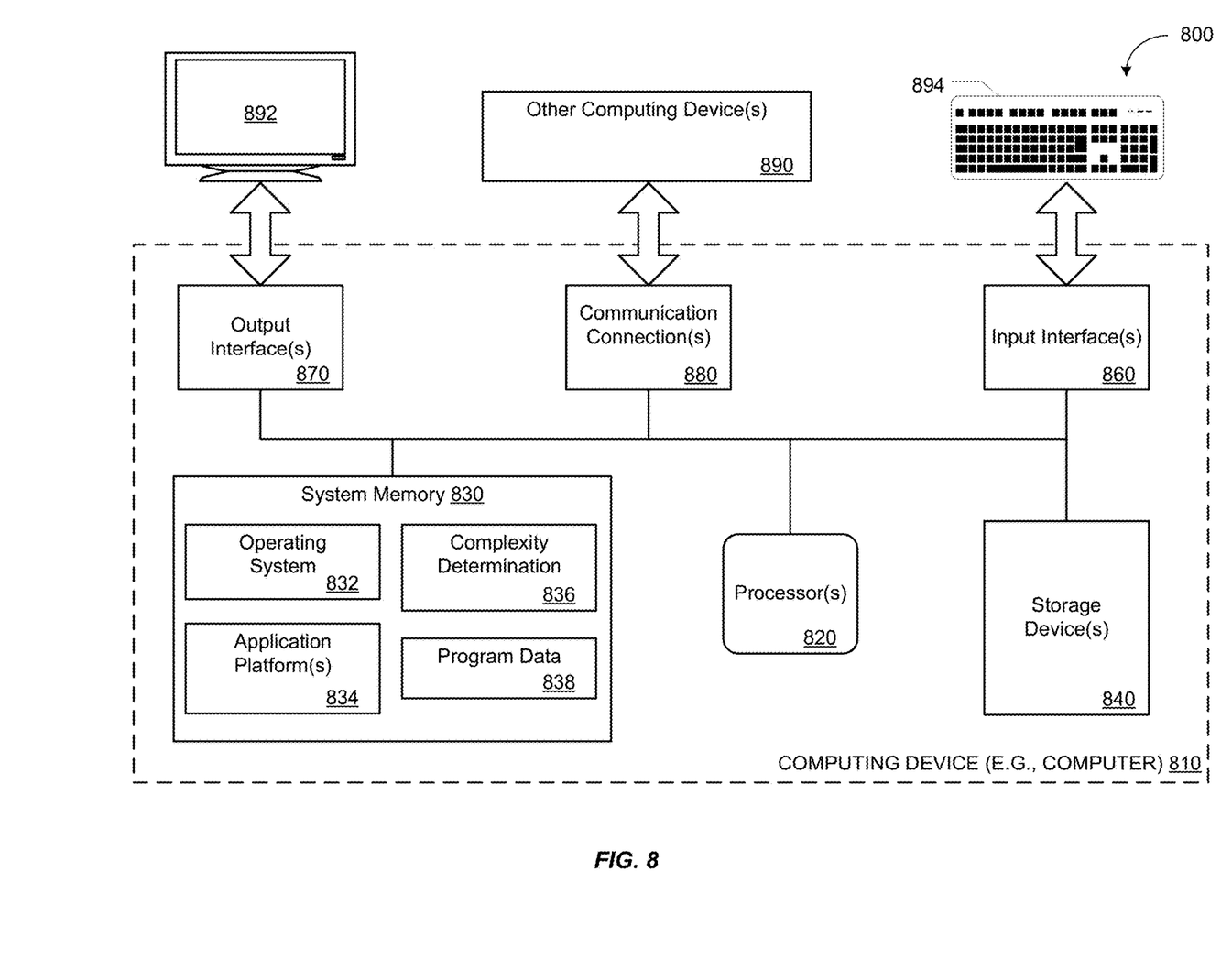
FIG. 8 illustrates a particular embodiment of a computing device operable to support embodiments of methods, systems, and computer programs described with reference to FIGS. 1-7.

FIG. 8 is a block diagram of a computing environment 800 including a computing device 810 that is operable to support embodiments of computer-implemented methods, computer program products, and system components according to the present disclosure.

The computing device 810 includes at least one processor 820 and a system memory 830. For example, the computing device 810 may be a desktop computer, a laptop computer, a tablet computer, a mobile phone, a server, or any other fixed or mobile computing device. Depending on the configuration and type of computing device, the system memory 830 may be volatile (such as random access memory or "RAM"), non-volatile (such as read-only memory or "ROM," flash memory, and similar memory devices that maintain stored data even when power is not provided), some combination thereof, or some other memory. The system memory 830 may include an operating system 832, one or more application platforms 834, one or more applications, and program data 838. In the embodiment illustrated, the system memory 830 includes a complexity determination application 836 (or executable instructions corresponding thereto). For example, the complexity determination application may be executable to perform one or more operations described with reference to the calculators 110-140 of FIG. 1, the method 700 of FIG. 7, or any combination thereof.

The computing device 810 may also have additional features or functionality. For example, the computing device 810 may also include removable and/or non-removable additional data storage devices, such as magnetic disks, optical disks, tape, and memory cards. Such additional storage is illustrated in FIG. 8 by storage device(s) 840. For example, the storage device(s) 840 may include the data store 150 of FIG. 1. Computer-readable or processor-readable storage media may include volatile and/or non-volatile storage and removable and/or non-removable media implemented in any technology for storage of information such as computer-readable instructions, data structures, program components or other data. The system memory 830 and the storage device(s) 840 are examples of computer-readable storage devices, which may store instructions executable by the processor(s) 820 to perform one or more functions or methods described herein. Computer-readable storage devices include, but are not limited to, RAM, ROM, electrically erasable programmable read-only memory (EEPROM), flash memory, solid state or other memory technology, compact disks (CD), digital versatile disks (DVD) or other optical storage, magnetic cassettes, magnetic tape, magnetic disk storage or other magnetic storage devices, and other storage devices that can be used to store information and that can be accessed by the computing device 810. Any such computer-readable storage device may be part of the computing device 810. A computer-readable storage device is not a signal.

The computing device 810 may also have one or more input devices, such as an illustrative keyboard 894, a mouse, a pen, a voice input device, a touch input device, etc. connected via one or more input interfaces 860. One or more output devices, such as an illustrative display device 892, speakers, a printer, etc. may also be included and connected via one or more output interfaces 870. The input interfaces 860 and the output interfaces 870 may each include one or more wired or wireless interfaces, such as a universal serial bus (USB) interface, a video graphics array (VGA) interface, a serial interface, a digital visual interface (DVI), a high-definition multimedia interface (HDMI), or some other interface.

The computing device 810 has one or more communication connections 880 that enable the computing device 810 to communicate with other computing devices 890 over a wired or a wireless network. For example, the other computing devices 890 may include external data sources, such as data sources from which portfolio holdings data, prospectus information, trading data, etc. can be retrieved. For example, the other computing devices 890 may correspond to financial market or asset data sources, such as third party financial institution databases, banking or non-banking organizations, websites, web portals, blogs, etc.

Particular embodiments of disclosed techniques may be implemented in conjunction with a client-server architecture. To illustrate, the computing device 810 may be an application server or other server that hosts the complexity determination application 836. A user may operate a client computing device that executes a client-side application, such as a browser, to communicate with the complexity determination application 836. Alternately, the computing device 810 may represent a client-side computing device. Databases and other data stores described herein may include device(s) at a single location or at multiple locations.

It will be appreciated that not all of the components or devices illustrated in FIG. 8 or otherwise described in the previous paragraphs are necessary to support embodiments as herein described. It will also be appreciated that the computing device 810 may have additional or different components or devices than illustrated in FIG. 8 or otherwise described in the previous paragraphs.

Although the exemplary embodiments described herein are intended to enable a person skilled in the art to practice such embodiments, it should be understood that other embodiments may be realized and that logical and physical changes may be made without departing from the scope of the present disclosure. Thus, the detailed description herein is presented for purposes of illustration only and not for limitation.

For the sake of brevity, conventional data networking, application development and other functional aspects of the systems (and components of the individual operating components of the systems) may not be described in detail herein. Furthermore, the connecting lines shown in the various figures are intended to represent exemplary functional relationships and/or physical couplings between the various elements. It should be noted that many alternative or additional functional relationships or physical connections may be present in a system.

In one embodiment, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. Similarly, while the description may make reference to web clients, personal computers, and servers, it will be appreciated that other embodiments may include implementations using point of service (POS) devices, kiosks, handheld devices such as personal digital assistants cellular telephones, smartphones, or other devices. This disclosure is intended to cover any and all subsequent adaptations or variations of various embodiments.

The Abstract is not intended to be used in interpreting or limiting the scope or meaning of the claims. In addition, the disclosure is not to be interpreted as indicating that the claimed embodiments require more features than are expressly recited in each claim. Thus, the present disclosure is not intended to be limited to the embodiments shown herein but is to be accorded the widest scope possible consistent with the principles and novel features as defined by the following claims.

What is claimed is:

1. A method for alerting an enterprise of changes to a complexity of a portfolio including a plurality of securities, the method comprising:
configuring a memory to store portfolio data for the plurality of securities, the memory coupled to a processor;
dynamically determining portfolio holdings by the processor based on information retrieved from external data sources via a network, the portfolio data associated with the portfolio holdings;
dynamically determining percentage level contributions of each component associated with the portfolio data by the processor based on the information retrieved from the external data sources via the network or via a website that maintains updated trading data and portfolio holdings information based on trading performed on the portfolio, wherein the percentage level contributions are dynamically determined using a mapping between different naming conventions of the external data sources stored in a database;
dynamically determining by the processor, a complexity rating associated with the portfolio data for the plurality of securities of the portfolio, wherein the portfolio data comprises a type of security for each of the plurality of securities;
automatically determining, by the processor, a plurality of complexity scores for the plurality of securities, wherein each complexity score of the plurality of complexity scores is based on the complexity rating and the contribution level of a corresponding security, and wherein a particular complexity score for a particular security is determined based on a combination of parameters including:
   a first parameter indicating whether the particular security is a pooled asset backed security;
   a second parameter indicating whether the particular security has a prepayment risk;
   a third parameter indicating whether the particular security has a periodically leveraged return; and
   a fourth parameter indicating whether the particular security has a counterparty risk;
automatically determining, by the processor, a complexity score for the portfolio based on the plurality of complexity scores for the plurality of securities;
automatically sending, by the processor, an alert to a particular party based on a complexity score that has changed; and
automatically initiating, by the processor, at least one response action based on the complexity score for the portfolio exceeding a threshold, wherein the at least one response action includes providing training materials to a computing device associated with a particular financial advisor, scheduling a training session for the particular financial advisor, initiating a due diligence operation or an auditing operation with respect to the portfolio, or any combination thereof, and initiating a corresponding response action by the particular party.

2. The method of claim 1, wherein the complexity rating comprises a numerical rating, an alphabetical rating, or a combination thereof.

3. The method of claim 2, wherein the complexity rating of a particular security of the plurality of securities is based on a type of the particular security.

4. The method of claim 3, wherein the complexity rating has a first value and wherein the type of security is leveraged floater note, dual-index note, floater with a curve cap, range accrual note, target redemption note (TARN), agency pass through mortgage backed security (MBS), agency collateralized mortgage obligation (CMO) MBS, agency interest only (IO) MBS, agency principal only (PO) MBS, agency floater MBS, agency inverse floater MBS, bank loan, future contract, or commercial real estate.

5. The method of claim 4, wherein the complexity rating has a second value and wherein the type of security is retail structured product, constant maturity spread—swap rate, credit linked note, commodity linked note, private label mortgage backed security (MBS), commercial MBS (CMBS), asset backed security (ABS), forward contract, call option, put option, or swap.

6. The method of claim 5, wherein the second value is greater than the first value.

7. The method of claim 5, wherein the complexity rating has a third value that is assigned to non-daily liquidity, portfolio of portfolios, Cayman subsidiary, short position, or accounting leverage.

8. The method of claim 7, wherein the third value is less than the first value and less than the second value.

9. The method of claim 1, wherein:
   when the contribution level of a particular security of the plurality of securities is in a first range, the particular security has a first complexity weighting factor;
   when the contribution level of the particular security is in a second range, the particular security has a second complexity weighting factor;
   when the contribution level of the particular security is in a third range, the particular security has a third complexity weighting factor;
   when the contribution level of the particular security is in a fourth range, the particular security has a fourth complexity weighting factor;
   when the contribution level of the particular security is in a fifth range, the particular security has a fifth complexity weighting factor.

10. The method of claim 9, wherein at least two of the first range, the second range, the third range, the fourth range, or the fifth range are equal in size.

11. The method of claim 1, wherein the complexity score of a particular security is given by:

$$S=R*W,$$

where S is the complexity score of the particular security, R is the complexity rating, and W is a weighting factor corresponding to the contribution level.

12. The method of claim 11, wherein the complexity score of the portfolio is given by:

$$C=\Sigma S_i$$

where C is the complexity score of the portfolio and $S_i$ is the complexity score of the $i^{th}$ security of the portfolio.

13. The method of claim 1, further comprising determining a scaled complexity grade of the portfolio based on the complexity score of the portfolio.

14. The method of claim 1, further comprising determining a complexity of an investment category based on the complexity of the portfolio.

15. A non-transitory computer-readable medium storing instructions that, when executed by a processor, cause the processor to alert an enterprise of changes to a complexity of an investment portfolio including a plurality of securities by performing operations comprising:
   configuring a memory to store portfolio data for the plurality of securities based on a connection to the processor;
   dynamically determining portfolio holdings based on information retrieved form external data sources via a network, the portfolio data associated with the portfolio holdings;
   dynamically determining percentage level contributions of each component associated with the portfolio data based on information retrieved from the external data sources via the network or via a website that maintains updated trading data and portfolio holdings information based on trading performed on the portfolio, wherein the percentage level contributions are dynamically determined using a mapping between different naming conventions of the external data sources stored in a database;

dynamically determining a complexity rating associated with the portfolio data, wherein the portfolio data comprises a type of security for each of the plurality of securities;
automatically determining a plurality of complexity scores, wherein each of the plurality of complexity scores corresponds to a security of a plurality of securities of the investment portfolio, wherein the complexity score of each security is based on the complexity rating of the security and a contribution level of the security to the investment portfolio, and wherein a particular complexity score for a particular security is determined based on a combination of parameters including:
  a first parameter indicating whether the particular security is a pooled asset backed security;
  a second parameter indicating whether the particular security has a prepayment risk;
  a third parameter indicating whether the particular security has a periodically leveraged returns; and
  a fourth parameter indicating whether the particular security has a counterparty risk;
automatically determining a complexity score of the investment portfolio based on the plurality of complexity scores of the plurality of securities;
automatically sending an alert to a particular party based on a changed complexity score that has changed; and
automatically initiating at least one response action based on the complexity score for the investment portfolio exceeding a threshold, wherein the at least one response action includes providing training materials to a computing device associated with a particular financial advisor, scheduling a training session for the particular financial advisor, initiating a due diligence operation or an auditing operation with respect to the investment portfolio, or any combination thereof, and initiating a corresponding response action by the particular party.

16. The non-transitory computer-readable medium of claim 15, wherein the complexity rating of a particular security of the plurality of underlying components is based on:
  whether the particular security is a pooled asset backed security;
  whether the particular security has a prepayment risk;
  whether the particular security involves particular credit worthiness of one or more underlying borrowers;
  whether repayment of a principal or a yield depends on a reference asset having particular characteristics;
  whether the particular security provides for different stated returns throughout a life of the particular security contingent upon whether the reference asset performs in a range;
  whether investors may incur a capital loss without being able to participate in an increase in value;
  whether performance of the reference asset has a disproportionate impact on prepayment of capital or on payment of return;
  whether the particular security has contingencies in gains and losses;
  whether the particular security is a structured note with particular features;
  whether the particular security is tied to performance of one or more particular markets;
  whether the particular security has leveraged returns that can be reset periodically;
  whether the particular security has particular limits or formulas for calculation of investor gains; and
  whether the particular security involves counterparty risk.

17. The method of claim 1, further comprising retrieving updated trading data and portfolio holding information from an external server, wherein the portfolio data is based on the updated trading data and the portfolio holding information.

18. The method of claim 1, further comprising determining a complexity drift associated with the portfolio based on the complexity score of the portfolio and historical complexity data, wherein the historical complexity data includes time series complexity data.

* * * * *